United States Patent
Cunningham et al.

[11] Patent Number: 6,044,888
[45] Date of Patent: Apr. 4, 2000

[54] LIFT AND SPIN DEVICE FOR RIM HOLDING TIRE CHANGERS

[75] Inventors: Charles L. Cunningham, Nashville; David Randall Greer, Jr., Murfreesboro, both of Tenn.

[73] Assignee: Hennessy Industries, Inc., LaVergne, Tenn.

[21] Appl. No.: 09/012,099

[22] Filed: Jan. 22, 1998

[51] Int. Cl.$^7$ .................................................. B60C 25/00
[52] U.S. Cl. .............................................. 157/19; 157/1.1
[58] Field of Search .......................... 157/14, 1.17, 1.22, 157/1.24, 1.9

[56] References Cited

U.S. PATENT DOCUMENTS

| | | | |
|---|---|---|---|
| 1,567,472 | 12/1925 | Skiles ........................................ | 157/13 |
| 2,753,924 | 7/1956 | Pearne ..................................... | 157/1.28 |
| 3,033,268 | 5/1962 | Schaevitz ............................... | 157/1.26 |
| 3,523,567 | 8/1970 | Voigts .................................... | 157/1.17 |
| 3,782,442 | 1/1974 | James, Jr. ............................... | 157/1.26 |
| 4,102,380 | 7/1978 | Holder ................................... | 157/1.26 |
| 4,293,020 | 10/1981 | Leeper et al. . | |
| 5,623,981 | 4/1997 | Cunningham et al. ..................... | 157/1 |

*Primary Examiner*—Timothy V. Eley
*Assistant Examiner*—Dung Van Nguyen
*Attorney, Agent, or Firm*—Waddey & Patterson; I. C. Waddey, Jr.

[57] ABSTRACT

A device which can be retrofitted onto existing passenger vehicle rim holding tire changers or provided as a feature of such equipment by the original equipment manufacturer. An operator rolls a tire into contact with the device and the device lifts the tire, causing it to spin and come to rest adjacent a bead loosener shoe with a different section of the tire facing the shoe. The device includes a pair of parallel rollers arranged at different heights and spaced slightly from each other. The roller that is relatively lower is closer to the operator while the higher roller is to the rear of the tire changer. The rollers extend perpendicularly from the side of the tire changer. When a tire is rolled into contact with the device, it engages the lower roller first and bounces up to become slightly airborne. The bounce causes the tire to spin relative to its rolling path. The tire then engages both rollers and cradles on them in a resting position. However, because the two rollers can rotate, the tire continues to spin slightly as it rests on the rollers, thus rotating the tire relative to its previous position. A bead loosener shoe adjacent the tire changer forces the tire form the rim, and as the tire is repeatedly bought into contact with the device, a different arcuate section of the rim is exposed to the shoe.

10 Claims, 5 Drawing Sheets

LIFT AND SPIN DEVICE FOR RIM HOLDING TIRE CHANGERS

BACKGROUND OF THE INVENTION

The present invention relates generally to rim holding tire changers and more particularly to a tire rotation and handling device for use in connection with passenger vehicle rim holding tire changers.

It will be appreciated by those skilled in the art of designing and manufacturing equipment used to change the tubeless tires mounted on the rims of cars, light trucks and other vehicles that such equipment must perform quickly and efficiently in order to be competitive in the marketplace. Modest improvements in the industry, can thus become significant.

The type of equipment for which Applicant's invention is designed is known generally in the industry as a rim holding tire changer. Examples of the type equipment involved are the rim holding tire changers manufactured by Hennessy Industries, Inc., Applicant's assignee, and marketed under the trademarks "COATS®" and "AMMCO®" including the COATS® models 5030A and the model 5060A-E and 5060AX-EX. However, there are many manufacturers of such equipment, including FMC Corporation of Chicago, Ill., Corghi of Correggio, Italy and Sice of Correggio, Italy. Equipment of this type has been readily available in the market for many years, is the subject matter of numerous patents and has been described in a variety of publications, bulletins, brochures, operating and instruction manuals, and the like. One such machine is illustrated in the design patent issued to Applicant as co-inventor in U.S. Design Pat. No. 293,916.

In the normal tire changing procedure, the operator places a rim on the table of the rim holding tire changer, secures the rim to the table, places a tire over the rim, mounts the tire on the rim by using a mount/dismount head to force the bead over the rim and then fills the air chamber of the tire with air to inflate the tire. This procedure is described in detail in U.S. patent application Ser. No. 08/516,129, the substance of which is incorporated herein by reference, and which is assigned to the assignee of the present invention. However, assuming that the customer is not buying a new rim, before this procedure begins, the operator must first remove the customer's old tire from the rim.

A tubeless tire mounted on a rim seals the air inside the chamber of the tire by "seating" the bead of the tire against the "hump" of the rim. This seal is maintained by substantial pressure both from the air inside the chamber of the tire and the load of the vehicle on which the tire is mounted. After many miles of travel, the seal becomes very difficult to break. The tire sticks to the rim and must be forced or pried loose in order to remove the old tire so that it can be replaced with a new one. To assist in breaking the seal between the tire bead and the rim, rim holding tire changers have been provided with a device called a "bead loosener shoe". A bead loosener shoe is an arcuate wedge that has a smooth edge generally in the shape of a portion of the rim at the point where the bead of the tire seats on the rim. The shoe is pivotally mounted on an arm that allows an operator to bring the shoe into contact with the tire/rim at the point of seal and the shoe is then forced between the tire and the rim to break the seal at the point of contact. The tire must then be rotated so that the next section of the seal can be broken. To do this, the operator must roll the tire away from the shoe, lift the tire and spin it so that when it is rolled back into contact with the shoe, a different section of the seal will be exposed to the shoe. This process requires the operator to lift the tire from an awkward position, putting unwanted pressure and strain on the back of the operator. The procedure is also time consuming.

Since the tire must be rotated several times to break the seal completely around the perimeter of the rim, and the seal must be broken on both sides of the rim, the process is repeated several times in the changing of a single tire. An operator who performs this process on a full time basis will experience fatigue and occasionally may be injured on the job. There is not currently available any device to assist in this process or to relieve some of the pressure and strain caused by the process.

Tire changers designed for use in changing the tires of large trucks, construction equipment and the like, have employed devices to assist with the lifting and spinning of the tires due to their weight. One such device is a roller mechanism employed by applicant's assignee in its HIT 6000 tire changer. However, no such device has been used on a tire changer used to change the tires of passenger vehicles, cars and light trucks.

What is needed then is a lift and spin device on a passenger vehicle tire changer that will reduce or eliminate the necessity of lifting and spinning the tire when using a shoe to break the seal between the tire and the rim.

In a number of passenger vehicle rim holding tire changers currently on the market, foot pedals are used to apply air pressure within the chamber of a tire that is being mounted on a rim. Thus, the operator is working primarily from one side of the device. The provision of a device on a passenger vehicle rim holding tire changer to assist with the lift and spin process, to be effective then, must be properly orientated to the foot pedals so that the operation of the device can be conducted efficiently. Such a device is presently lacking in the prior art.

SUMMARY OF THE INVENTION

Applicant's invention is a device which can be retrofitted onto existing passenger vehicle rim holding tire changers or provided as a feature of such equipment by the original equipment manufacturer. With Applicant's invention, the operator rolls a tire into contact with the device and the device lifts the tire, causes it to spin and come to rest adjacent the bead loosener shoe with a different section of the tire facing the shoe. The device includes a pair of rollers arranged at different heights and spaced slightly from each other. The roller that is relatively lower is closer to the operator while the higher roller is to the rear of the tire changer. When a tire is rolled into contact with the device, it engages the lower roller first and bounces up to become slightly airborne. The bounce causes the tire to spin relative to its rolling path. The tire then engages both rollers and cradles on them in a resting position. However, because the two rollers can rotate, the tire continues to spin slightly as it rests on the rollers, thus rotating the tire relative to its previous position, thereby exposing a different arcuate section of the rim to the shoe. The rollers are mounted on the side of the tire changer and extend perpendicularly from the side so that the operator can stay in one position, facing the front of the mainframe when the operator does the lift and spin operation, and is not required to walk around or to the side of the machine in order to perform this task.

DESCRIPTION OF THE PREFERRED EMBODIMENT

Figure 1:
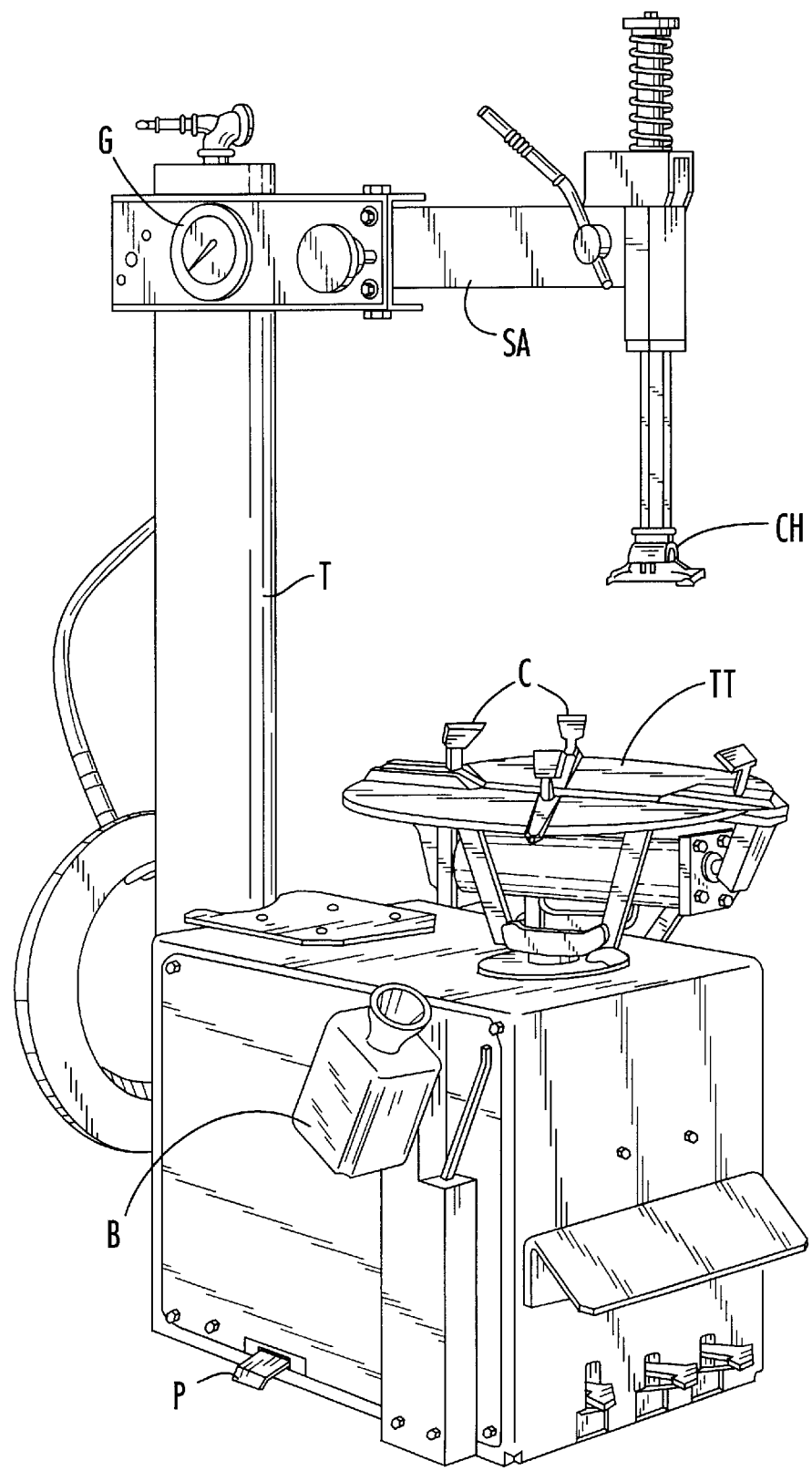
FIG. 1 is a perspective view of a prior art rim holding tire changer.

Applicant's invention will be best understood when considered in light of the following description of the preferred embodiment of the invention, as illustrated in the attached drawings wherein like reference numerals refer to like parts.

Figure 2:
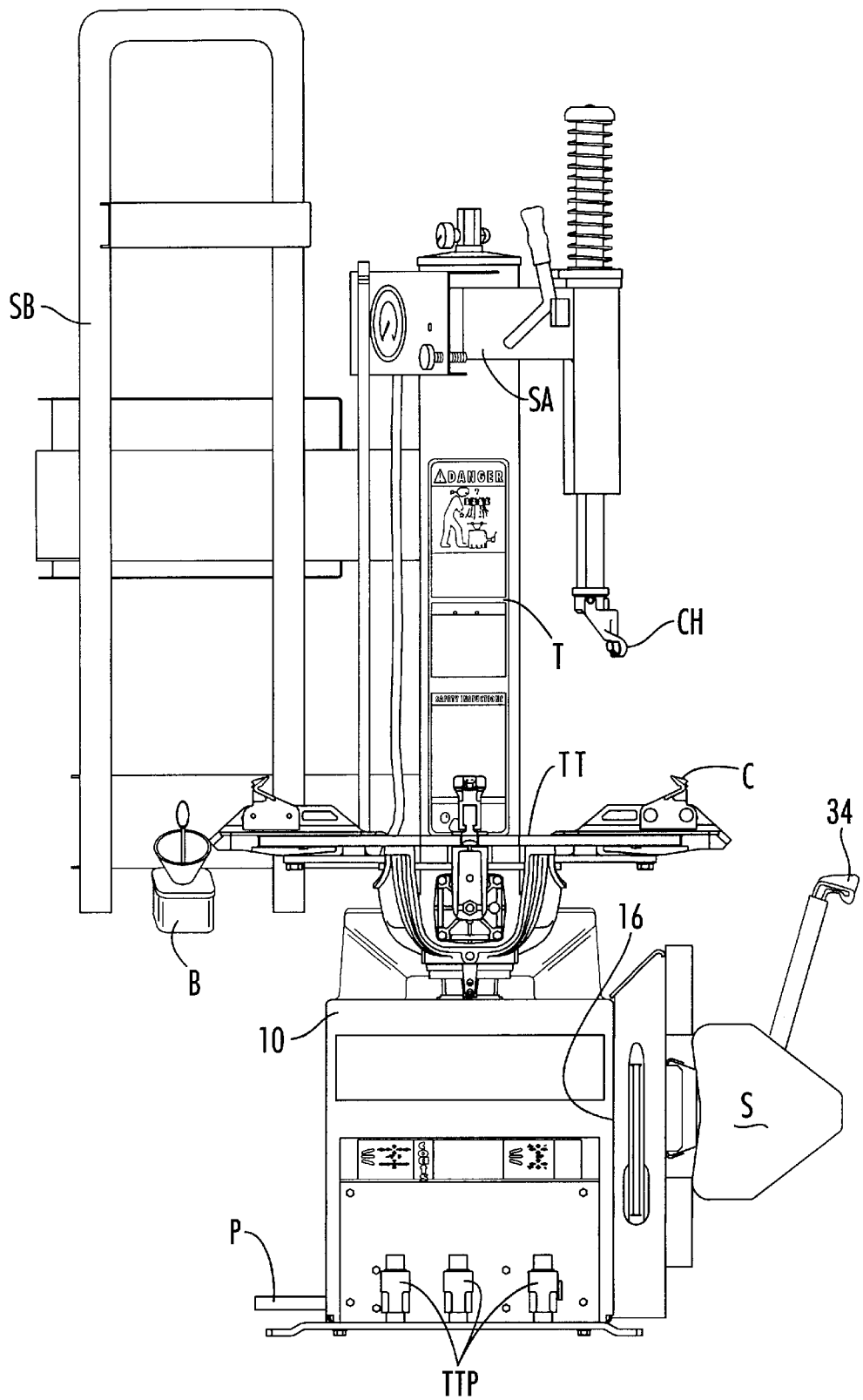
FIG. 2 is a front view of a rim holding tire changer similar to the changer illustrated in FIG. 1 but having a safety barrier.
Figure 3:
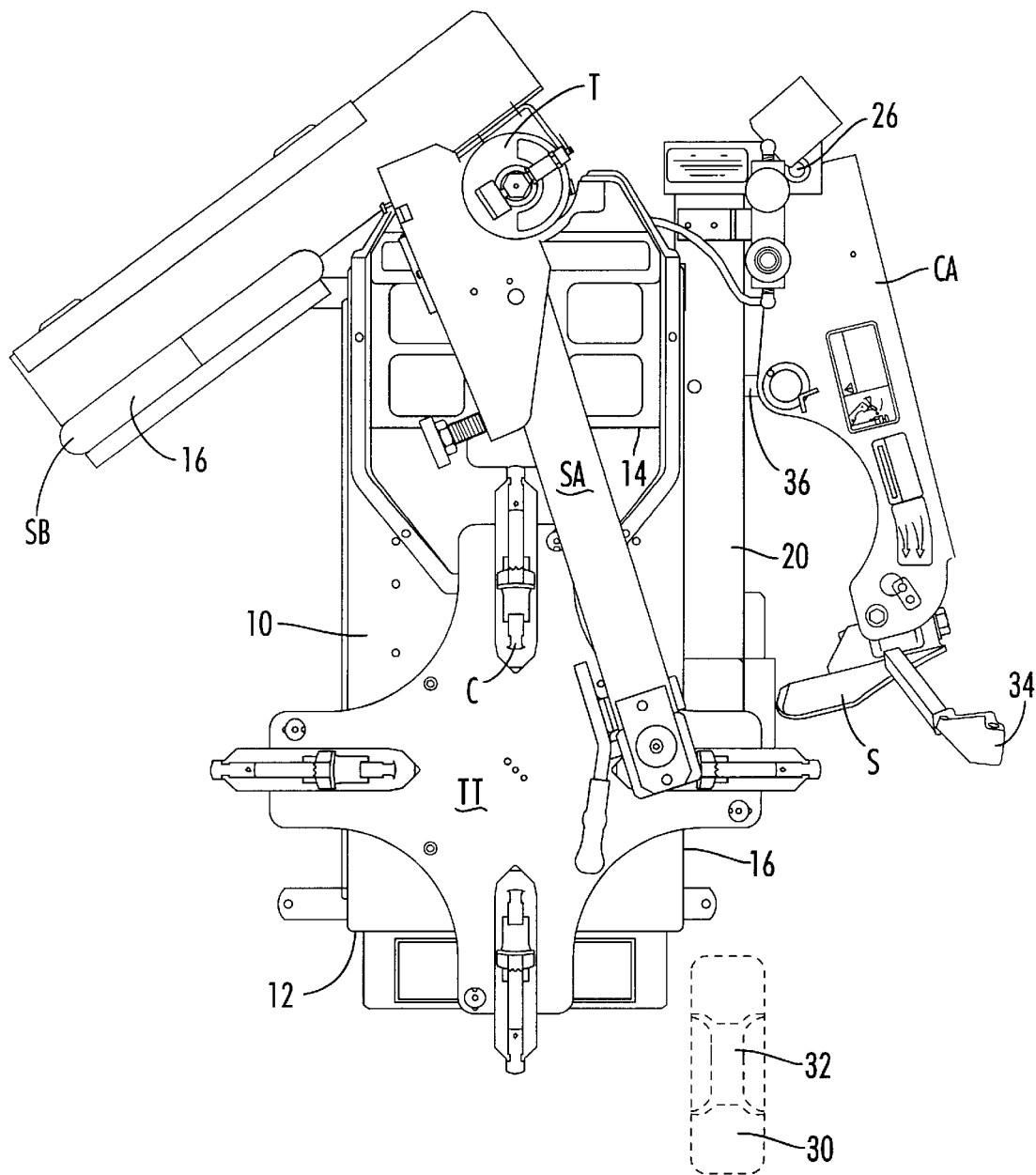
FIG. 3 is a top view of the rim holding tire changer shown in FIG. 2.

FIGS. 1–3 of the attached drawings show a prior art rim holding tire changer. The prior art device in FIGS. 2–3 is substantially the same as the device shown in FIG. 1, except that the latter does not include the safety barrier. Both devices include a tower T, an air gauge G, an inflation pedal P, a table top TT, clamps C, a lube bottle B, a combination mount/dismount head CH, a swing arm SA, table top pedals TTP, a carrier arm CA for the bead loosener shoe S, and the bead loosener shoe S itself. The changer shown in FIGS. 2–3 also includes a safety barrier SB.

In rim-holding tire changers of the type shown in FIGS. 1, 2, and 3, a tire and rim will be placed on the table top TT and the rim is held in position by the clamps C. The swing arm is then rotated into place so that the combination mount/dismount head CH can be engaged between the rim and the tire and the table can then be rotated to cause the combination mount/dismount head to pull the tire beads over the lip of the rim. Operation of the table and clamps are via the table top pedals TTP so the operator, in the course of mounting and dismounting of the tire on the rim is positioned at the front of the machine where the table top pedals are located.

The table top TT is mounted on the mainframe 10 of the rim holding tire changer. As can be seen best from FIG. 3, as the operator is standing in front of the machine and facing the machine, to his right is the bead loosener shoe carrier arm CA with the shoe S mounted up on one end of the carrier arm.

A beam 20 is mounted on the side of the main frame 10 and extends generally from the front 12 of the main frame toward the back 14 of the main frame. As can be seen from FIG. 4, the beam 20 extends beyond the back 14 of the main frame 10 and an L-shaped bracket 22 is attached to the end of beam 20. The L-shaped bracket 22 has a vertical channel 24 passing through it. The carrier arm CA is attached to the main frame with a pivot pin 26 passing through the carrier arm CA and the channel 24.

The carrier arm CA pivots about the pivot pin 26 so that it can be swung away from the main frame 10 and toward the main frame 10 as is needed for engaging the bead loosening shoe S with a tire that is rolled into position.

FIG. 3 shows in phantom lines a tire 30 mounted on a rim 32. The tire is sitting in a position to be rolled towards the rim holding tire changer or away from it, as the case may be, and when the tire 30 is rolled towards the tire changer, it will come into position where the point of engagement between the tire and the rim is adjacent the lip of shoe S. The carrier arm CA can then be swung towards the main frame 10 by an operator grasping the handle 34 and pulling the carrier arm toward the main frame. When the carrier arm is pulled toward the main frame, the shoe S is placed in contact with the tire and rim at the point of engagement between the tire 30 and rim 32. Next, one of the table top pedals is pressed to actuate a piston cylinder arrangement 36 extending between the carrier arm and the beam 20 intermediate the opposite ends of the carrier arm. One end of the cylinder portion of the piston cylinder arrangement 36 can be attached to the beam 20 or on some other part of the main frame, with the piston extending from the opposite end of the cylinder and the free end of the piston attached to the carrier arm. When the piston cylinder arrangement 36 is activated by one of the table top pedals TTP, either hydraulic or pneumatic pressure causes the piston to retract into the cylinder. When the piston retracts toward the mainframe, the free end of the piston, being linked to the carrier arm, causes the carrier arm to be pulled toward the main frame 10. Because the carrier arm CA is pivotally mounted to the beam by pivot pin 26, pulling the carrier arm toward the main frame will cause the shoe S to be forced toward the main frame. Since the tire 30 is held against the mainframe, forcing the shoe S toward the main frame will result in the shoe separating the tire 30 from the rim 32 at the point of engagement.

After the seal between the tire and rim is broken, the foot pedal is released, the pressure of the piston cylinder arrangement is reversed, and the carrier arm swings in the opposite direction. At this point in the normal procedure, the tire 30 is rolled back toward the operator to a point where the operator can lift the tire, and while lifting the tire, the operator will attempt to spin it slightly and drop it back onto the floor. After the tire has been spun, it will then be rolled back in a point where it can be engaged by the shoe S for a repeat of the operation described above. Spinning the tire causes a new area of the tire/rim engagement to be presented to the shoe S for detachment when the tire is rolled back into position. This procedure is repeated until the tire is completely disengaged from the rim on the one side, and then the tire is then rolled back toward the operator, rotated 180 degrees along its vertical axis and the entire procedure repeated to detach the tire from the rim on the opposite side of the tire/rim combination.

Once the tire has been completely loosened from the rim, it is then lifted by the operator, placed on the table top, and the tire changing procedure completed.

As can be seen from the foregoing procedure, an operator will have to lift and spin the tire several times before the procedure is completed. Changing the tires on one vehicle will result in a multiple of four times that effort and if an operator is required to change the tires on several vehicles during the course of a day, the procedure can obviously become exhausting. The time spent during this procedure tends to increase as the operator becomes fatigued, and it also exposes the operator to potential injury due to the awkward position that the operator has to work from in order to lift and spin the tire at the same time.

Figure 4:
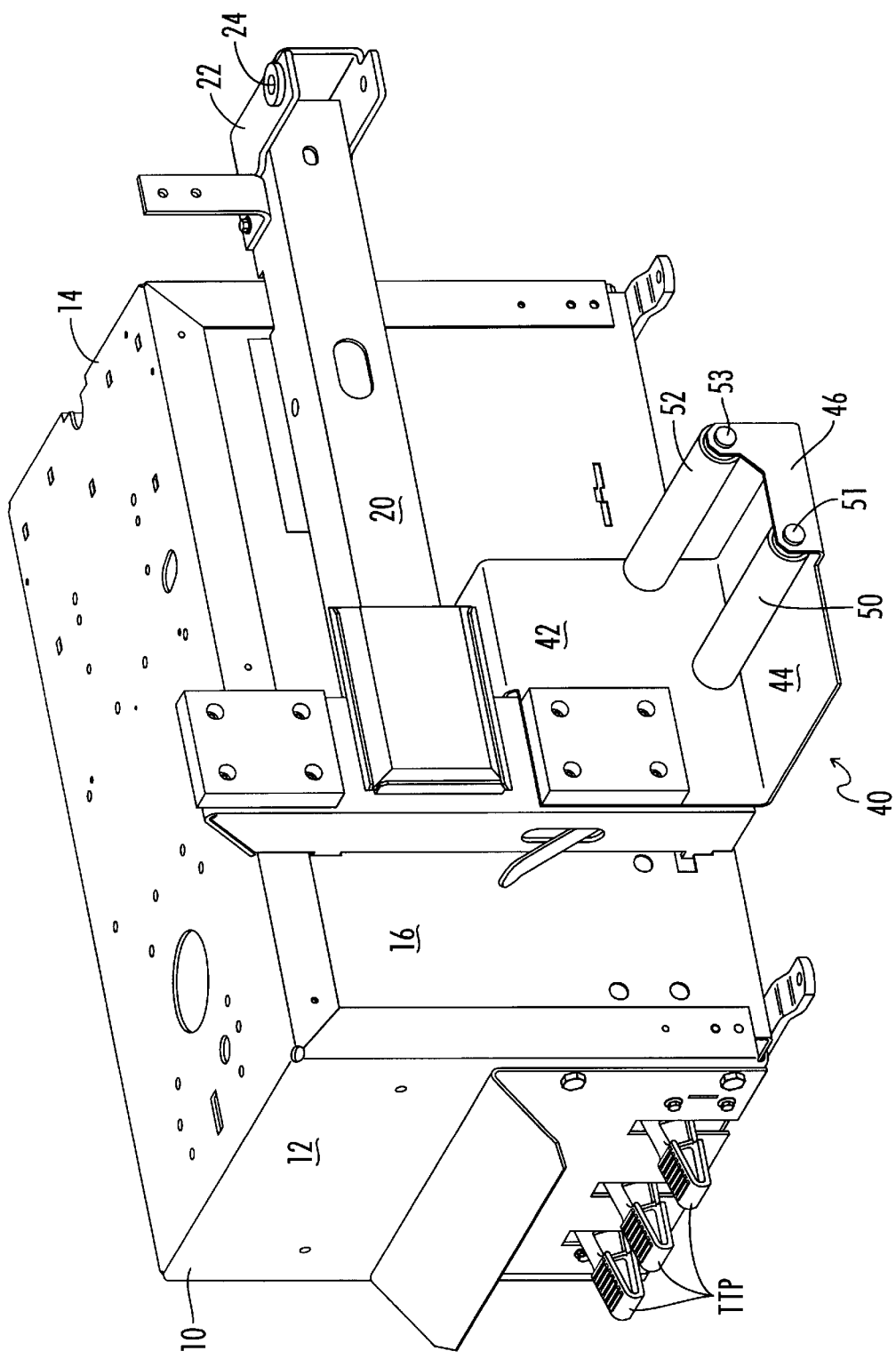
FIG. 4 is a schematic of a rim holding tire changer body having the lift and spin device of Applicant's invention attached thereto.
Figure 5:
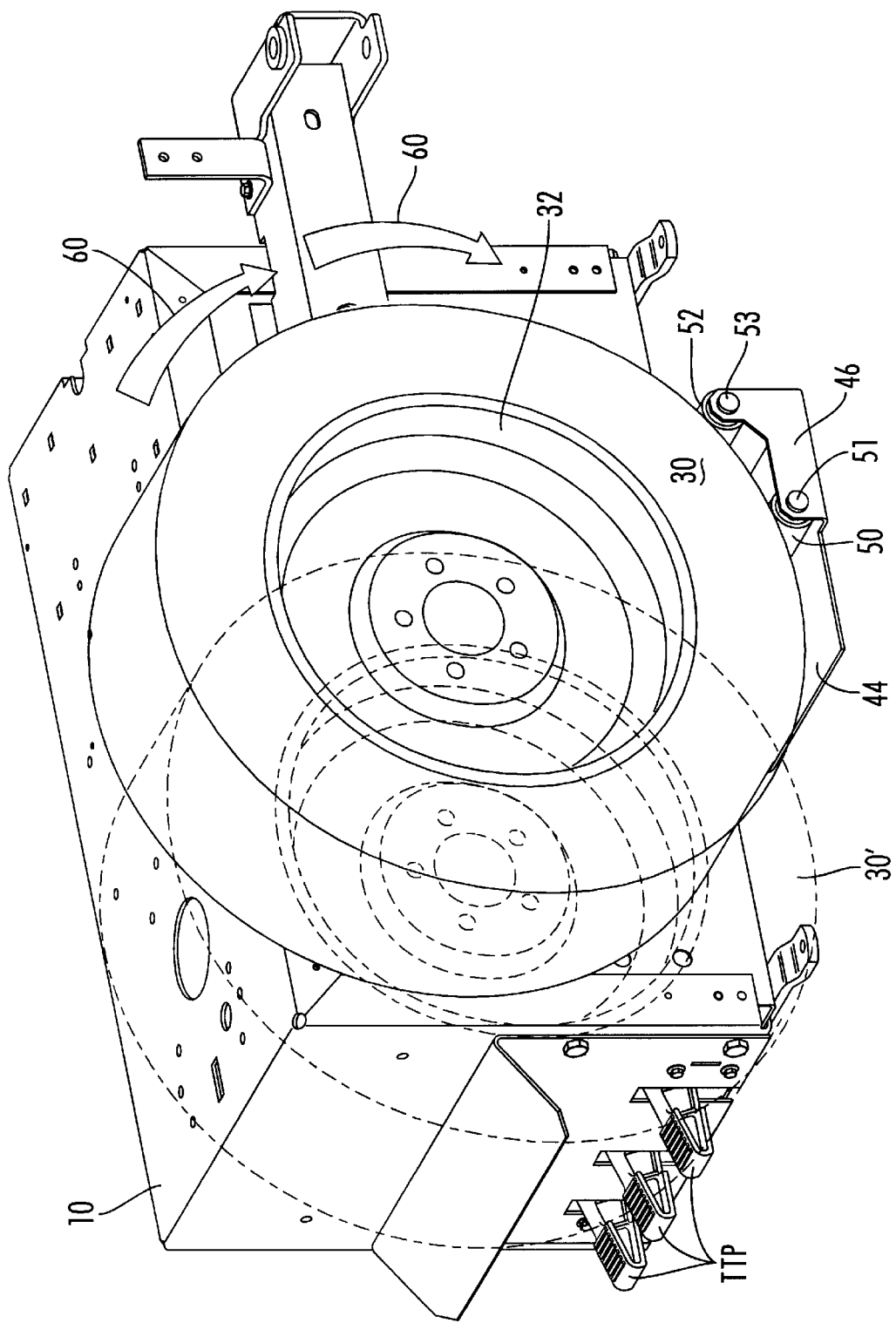
FIG. 5 is a schematic of a rim holding tire changer body having the lift and spin device of Applicant's invention attached thereto with a tire shown on the device.

Applicant's invention is illustrated in FIGS. 4 and 5 and is designed to eliminate the need for the operator to lift and spin the tire during the procedure described above. As can be seen from FIGS. 4 and 5, Applicant's invention is illustrated generally at 40. The lift and spin device 40 includes a frame consisting of a vertical plate 42 and a base 44 with the plate 42 and base 44 connected to each other in a perpendicular fashion. An end piece 46 is welded or otherwise formed as a part of base 44 and extends up perpendicularly from the free end of the base 44. The plate 42 is designed to be attached to the side 16 of the main frame 10 in a secure manner.

Extending between the plate 42 and the end piece 46 are rollers 50 and 52. As can be seen from FIGS. 4 and 5, rollers 50 and 52 are generally cylindrical-shaped and have parallel axes. When the lift and spin device of Applicant's invention is mounted on the floor as a part of the main frame of a rim holding tire changer, roller 52 is spaced toward the back 14 of the main frame from roller 50 and is at a height slightly higher than roller 50. The rollers 50 and 52 are mounted on dowels 51 and 53 extending between the plate 42 and the end piece 46. Thus, rollers 50 and 52 are able to freely rotate about the dowels 51 and 53.

Looking now at FIG. 5, a tire 30 mounted on a rim 32 is shown in place on the lift and spin device of Applicant's invention. The tire is shown at 30' in phantom lines which would be the position of the tire prior to the lift and spin effect of Applicant's invention. After the shoe S has been used to break the point of engagement between the tire 30 and the rim 32 at one point, the tire 30 will be rolled by the operator back to the position shown at 30'. The tire is then rolled forward to bump against the roller 50 at which point the tire will bounce slightly and the friction of the engagement between the roller 50 and the tire 30 will tend to cause the tire to spin in the direction of the arrows 60. When the tire settles onto the two rollers 50, 52, it will continue to spin slightly forward in the direction of the arrows 60 because the rollers 50, 52 are allowed to rotate freely about the dowels 51, 53. Thus, the arcuate section of the tire/rim combination 30, 32 that is in position to be engaged by the shoe S has been advanced. As can be seen from the arrangement shown, particularly in FIG. 5. as the wheel is moved into engagement with the lift and spin device of Applicant's invention, the wheel does not have to be lifted by an operator in order to rotate it relative to its previous position.

Rolling the wheel causes less strain and is less time-consuming than the prior art practice of lifting and spinning the tire. Further, because of the arrangement of the lift and spin device of the present invention to the main frame and other operating features of the rim holding tire changer, the efficiency of the device is greatly improved. Specifically, by having the rollers 50, 52 extending perpendicularly out from the side 16 of the main frame, the wheel can be aligned along the length of the main frame for the lift and spin procedure. The operator can stay at one position, facing the front 12 of the main frame when he does the lift and spin operation, and is not required to walk around or to the side of the machine in order to perform this task. Thus, the simplicity of the arrangement of the structure allows the tire changing procedure to be done in an economy of speed and with less strain on the operator, thereby reducing time and energy spent, and avoiding potential injury to the operator.

Thus, although there have been described particular embodiments of the present invention of a new and useful lift and spin device for rim holding changers, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What we claim is:

1. A lift and spin device for a tire changer of the type having a mainframe, said mainframe having a front and a rear and opposing sides, a table on which a rim can be mounted and means for clamping a rim mounted on said table in a fixed relation to said table while a tire is mounted on or removed from the rim, clamping controls for activating said clamping means, said clamping controls located at the front of said mainframe; said tire changer also having a carrier arm, said carrier arm having a mounting end and a free end, the mounting end of said carrier arm pivotally supported adjacent one of said opposing sides and said carrier arm extending generally parallel to said one of said opposing sides, a bead loosening shoe mounted on the free end of said carrier arm, means for moving said bead loosening shoe toward said mainframe with sufficient force to cause said bead loosening shoe to separate a tire from a rim on which the tire is mounted, and control means for activating said moving means, said control means mounted adjacent said clamping controls; said lift and spin device comprising;

an elongated, cylindrical roller having an axis, said roller mounted adjacent said one of said opposing sides with said axis extending substantially perpendicularly from said one of said opposing sides and means for mounting said roller for rotation about said axis and for preventing movement of said roller in an axial direction.

2. The device of claim 1 further including a second elongated cylindrical roller having an axis, with the axis of the second roller being substantially parallel to the axis of the first roller.

3. The device of claim 2 wherein the axis of the second roller is spaced from the axis of the first roller and spaced toward the rear of the main frame as compared from the axis of the first roller.

4. The device of claim 3 wherein the axis of the second roller is positioned relatively higher than the axis of the first roller.

5. The device of claim 2 wherein the axis of the second roller is spaced above the axis of the first roller.

6. The device of claim 1 further including a substantially U-shaped frame, with said roller mounted to said frame for rotational, but not axial, movement.

7. The device of claim 6 wherein said U-shaped frame includes a base having opposing ends, a vertical plate attached to one end of said base, and an end piece attached to the other end of said base and said roller mounted between the vertical plate and the end piece.

8. The device of claim 7 wherein said plate is attached to said one side of said main frame.

9. The device of claim 1 wherein said roller is mounted on a dowel and is free to rotate about said dowel.

10. The device of claim 1 wherein said device sits on a surface, and said roller is above and spaced from said surface.

* * * * *